Nov. 7, 1933.　　　C. P. RANDOLPH　　　1,934,446
HEATING APPARATUS
Filed May 9, 1930
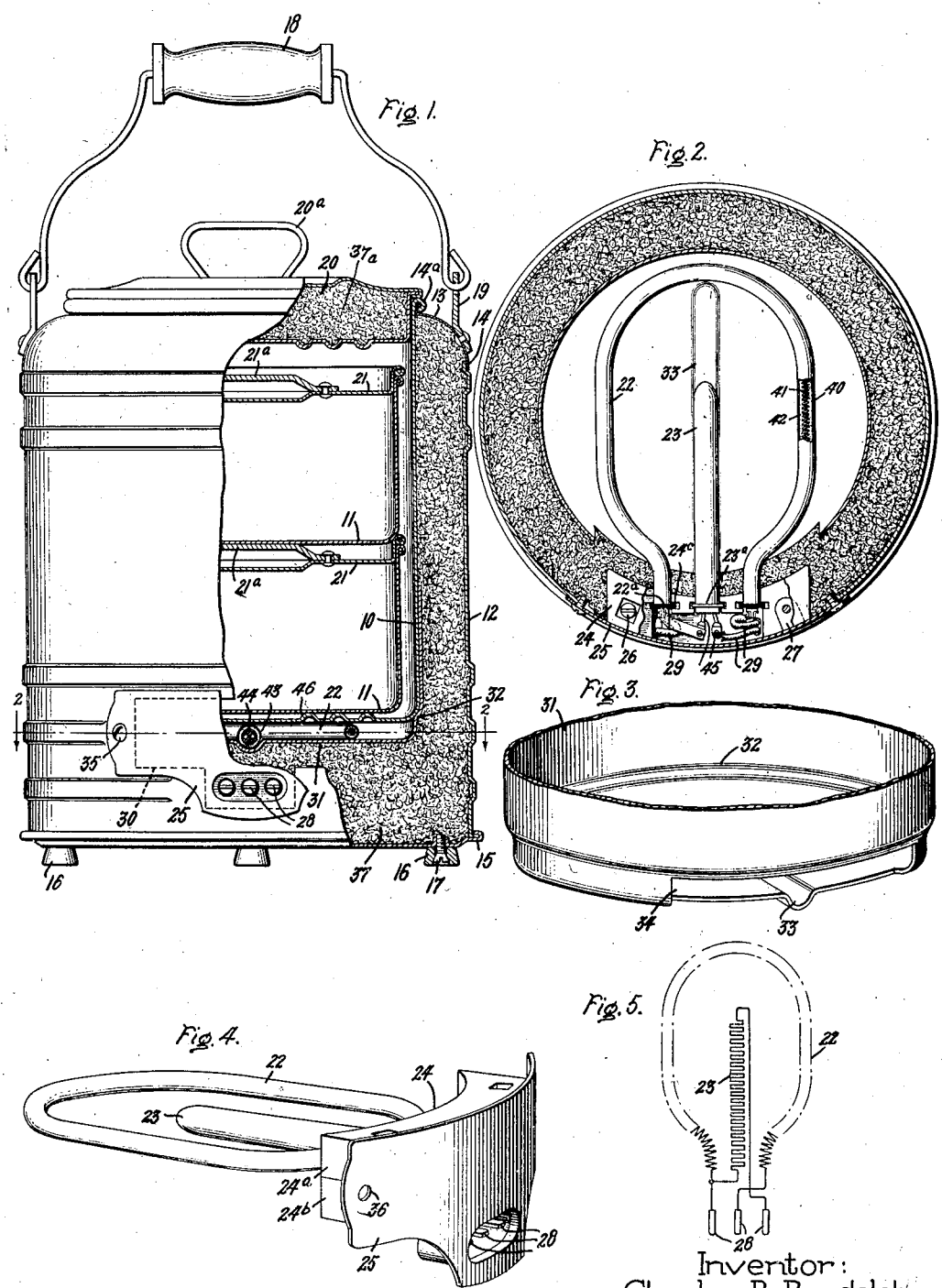
Inventor:
Charles P. Randolph,
by Charles E. Mullar
His Attorney.

Patented Nov. 7, 1933

1,934,446

UNITED STATES PATENT OFFICE 1,934,446

HEATING APPARATUS

Charles P. Randolph, Oak Park, Ill., assignor to Edison General Electric Appliance Company, Chicago, Ill., a corporation of New York Application May 9, 1930. Serial No. 451,169

8 Claims. (Cl. 219—35)

My invention relates to heating apparatus, more particularly to cooking apparatus, and has for its object the provision of improved apparatus of this character providing for the equalization of heat throughout various portions of the apparatus, and further, a simple and compact arrangement, convenient of assembly and reliable and efficient in operation.

My invention relates more specifically to electric cookers wherein heat insulated containers or pails are provided for the cooking utensils, the contents of which are brought to any suitable temperature by the application of heat from a suitable external source. In electrical cookers of this character it is the usual practice to locate the heating elements adjacent one or more of the walls of the pail. Thus for example, the heating elements often are placed beneath the bottom wall of the pail. Obviously with arrangements of this character, the entire quantity of heat that is utilized by the edibles being cooked is transmitted to them through but a comparatively small portion of the pail wall area. As a result, it frequently happens that those portions of the edibles next to the wall portion through which the heat is transmitted receive excessive amounts of heat, while the remaining portions receive but very little heat directly from the walls of the pail. Consequently, the edibles are cooked very slowly and furthermore, it is likely that they may not be cooked uniformly. Moreover, by reason of the fact that the heating elements as well as the pail are mounted within the heat insulating walls, it is possible that the heating elements may become seriously overheated which of course greatly shortens their useful life.

In carrying my invention into effect in one form thereof, I provide suitable means for conducting heat from the heating elements to portions of the pail other than those in direct thermal relation with the elements. This effects an equalization of heat from the elements over a considerable wall area of the pail and thereby provides for the direct transmission of heat to a comparatively large portion of the edibles being cooked. By reason of this distribution of the heat, it is possible to heat the materials within the cooking utensils very uniformly and furthermore, it is very unlikely that the heating elements will become excessively overheated.

I support the heating elements in thermal relation with the pail so that the entire heating apparatus can be removed as a unitary structure for the purpose of inspection, repair or replacement.

For a more complete understanding of my invention reference should be had to the accompanying drawing in which Fig. 1 is a vertical elevation of an electrical cooker embodying my invention, portions of the cooker being shown in section so as to illustrate certain structural details; Fig. 2 is a horizontal section taken through the line 2—2 of Fig. 1; Fig. 3 is a fragmentary perspective view of a heat equalizing member used in my electrical cooker; Fig. 4 is a perspective view of the heating elements and the terminal plate used in the electrical cooker shown in Fig. 1; and Fig. 5 is a diagrammatic view illustrating the arrangement of the electrical heating circuits.

Referring to the drawing, I have shown my invention in one form in connection with electrical cooking apparatus wherein a heat insulated pail or container 10 is provided for a plurality of cooking utensils 11. As shown, the pail or container 10 is provided with outer spaced metallic walls 12 forming a casing. The container 10 and its casing 12 preferably will have a cylindrical form, although it is to be understood that they may have any other suitable shape. Thus for example, the container and its casing may have a square cross section so as to provide a box-like formation.

As shown, the container or pail 10 is supported by its outer casing 12. For this purpose, I have provided a metallic breastplate 13. The lower end portion of this plate surrounds the upper end portion of the side walls of the casing 12 and is secured thereto by any suitable means, as by a seam weld 14, while its upper inturned end portion is mechanically interconnected with the upper end portion of the side walls of the pail 10 in any suitable manner, as by a spun-over joint 14a including the extreme end portions of the walls of the pail and breastplate. It will be observed that the pail 10 is suspended from the breastplate 13 so that its side walls are spaced from the side walls of the casing 12, and moreover that the pail has such a depth relative to the height of the surrounding casing that a considerable space will be left between the bottom wall of the pail and the bottom wall of the outer casing. Preferably and as shown, the side and bottom walls of the outer casing 12 will be formed separately and will be joined together in any suitable manner as by a spun-over joint 15. It will be understood that the pail 10, the utensils 11 and the walls 12 will be formed from any suitable metallic materials. It is preferable, however, to form the pail 10 and the utensils 11 from some suitable material having a relatively high heat conductivity such as aluminum. The outer casing 12 and likewise the breastplate 13 may be formed from sheet steel.

The cooker is supported by means of a plurality of feet 16 secured to the bottom wall of the outer casing in any suitable manner, as by means of screw fastening means 17. If desired these feet may be eliminated and the bottom wall suitably embossed so as to provide supporting members (not shown) formed integrally with the bottom wall. A suitable lifting handle 18 is secured to the breastplate 13 by means of handle brackets 19, which as shown are riveted to the breastplate. A suitable cover member 20 is provided for the pail 10, and likewise suitable cover members or lids 21 are provided for the cooking utensils 11. It will be observed that these covers or lids are provided with handles 20a and 21a respectively.

I provide a suitable source of heat for the cooker and prefer to apply the heat to the bottom wall of the pail or container 10. I also prefer to heat the pail by means of electrical heating elements of the sheathed wire type. As shown, I have provided a pair of sheathed heating elements 22 and 23, the element 22 having a substantially oval form so that when it is applied it will embrace a considerable area of the bottom wall of the container, while the element 23 is substantially straight and is embraced by the element 22. The heating elements 22 and 23 are secured in any suitable manner to a porcelain unit block 24 which may be formed in two parts 24a, 24b each part of which is suitably recessed so as to receive the end portions of the heating elements. Preferably and as shown, the ends of the heating elements will be provided with washers 22a and 23a, respectively, which are secured to the heating elements and which are loosely received in suitable recesses 24c in the blocks when the heating unit is assembled. The block 24 is fastened to the terminal plate by suitable bolts 26 which are passed through apertures provided in the block and through suitable apertured inturned ears 27 provided on the terminal plate. The terminal plate serves to support suitable terminal pins 28 which are electrically connected with the heating elements by terminal leads 29. It will be observed that by reason of this arrangement the heating elements, together with the terminal leads and pins are comprised or included into a unitary structure.

As thus constructed, the heating elements are applied to the cooker by inserting them through a suitable aperture 30 provided in the side wall of the outer casing 12, and are supported in good thermal relation with the bottom wall of the pail by means of a suitable supporting member 31. As shown, this member is of sheath-like form and has a cup shape so that when it is applied to the pail, its side walls will embrace a considerable portion of the side walls of the pail and will have practically a press fit therewith. The bottom wall of the sheath 31 will be spaced from the bottom wall of the pail so that the heating units will be received in the space between these walls and will be supported in good thermal relation with each of them. Preferably and as shown, the lower portions of the side walls of the sheath will be reduced in diameter so as to form a shoulder 32. This shoulder serves to limit the sheath wall depth in contact with the side walls of the container and thus serves to automatically determine the space between the bottom walls of the pail and sheath. The bottom wall of the sheath is provided with a suitable recess 33, the function of which is to receive the heating element 23 which as shown has a diameter somewhat larger than the diameter of the element 22. It is to be understood, however, that this recess is provided merely to accommodate the heating element 23 and may be eliminated if desired, particularly if this element has a diameter equal to or smaller than the diameter of the element 22. It will be understood that the sheath 31 will be provided with a suitable aperture 34 through which the heating unit will be inserted when it is desired to apply it to the pail.

As has been pointed out, I prefer to provide practically a press fit between the pail and its sheath 31. In order that the finished spun-over curled joint 14a will have a smooth and uniform finish, it is desirable that the mouth of the casing have a diameter substantially equal to the diameter of the pail 10. Thus, it is necessary to assemble the pail 10 with its casing 12 before the sheath is applied to the pail. It will be understood that if the sheath were applied before the pail is assembled with its casing it would be necessary to offset that portion of the pail which receives the sheath in order to insert the pail and sheath assembly through the opening in the casing. This generally is not desirable. Consequently, I prefer first to assemble the pail with its casing 12, the bottom of the casing being open, and then press the sheath in place over the lower portion of the pail. After the sheath has been applied, the entire space between the exposed side walls of the pail 10 and likewise the exposed walls of the sheath and the corresponding walls of the casing 12 will be filled with a suitable heat insulating material 37 such as rock wool. It will be understood that a suitable block or dummy unit will be used while the insulating material is being packed so as to maintain an opening for receiving the heating unit. After the insulating material 37 has been packed about the pail and sheath, the bottom wall of the casing 12 will be secured to its side walls by means of the spun-over connection 15. The cover member 20 for the pail as shown is provided with double walls between which any suitable insulating material 37a, such as rock wool, is placed.

The heating unit may then be applied. After the heating unit has been applied by inserting it through the apertures 30 and 34 provided in the casing 12 and the sheath 31 respectively and has been received in the space between the bottom walls of the sheath and pail, the terminal plate 25 is secured to the outer casing 12 in any suitable manner as by means of the screw fastening means 35, the terminal plate being provided with suitable apertures 36 for receiving the screws 35.

It will be understood that the sheath 31 in addition to its function of supporting the heating elements also serves as an equalizer of heat in that its side walls are in good thermal relation with the side walls of the pail. It will be understood that the sheath is formed from a suitable material having a comparatively high heat conductivity, such as aluminum, and consequently readily conducts heat from the heating elements to the pail. As a result, the materials within the pans or utensils 11 are heated very uniformly, and furthermore, any danger of the heating elements becoming excessively overheated has been eliminated. While I have shown the sheath enveloping but a portion of the walls of the pail, it will be understood that the sheath may be proportioned to cover any suitable portion or all of the wall area. Furthermore, the walls of the sheath may have a varying thickness. Thus for example, the lower wall portions of the sheath may be comparatively thick while the upper portions gradually taper to a comparatively thin width.

It will be understood that once the materials within the pans or utensils 11 have been heated, little energy is required to maintain their temperatures. Consequently, I control the energization of the heating elements 22 and 23 so as to provide a high rate of heat generation and also a comparatively low rate of heat generation. To secure the high heat rate, I energize the heating element 22 only, while to provide the low heat rate I energize both of the elements 22 and 23 connected in series relation. It will be observed (Fig. 5) that it is but necessary to connect the left hand pair of terminal pins 28 to the usual extension plug (not shown) in order to energize the heating unit 22 to provide the high heat rate and that it is but necessary to connect the two right hand terminal pins 28 with the power plug in order to energize the two units connected in series.

As has been pointed out, I prefer to use heating elements of the sheathed wire type. The element 22 preferably will be a unit of the sheathed wire type such as is described and claimed in the United States Patent No. 1,367,341, granted to C. C. Abbott, dated February 1, 1921, and briefly this heating unit comprises an outer metallic sheath 40 (Fig. 2) in which a helical resistance conductor 41 is embedded in a compacted insulating material 42, such as powdered magnesium oxide. It will be understood that such units can be bent easily into any desired shape, and as has been pointed out, this unit is bent into a substantially oval shape so as to embrace a considerable area of the bottom wall of the pail. Obviously, various other arrangements and configurations of the heating unit may be used. The heating element 23 is also of the sheathed wire type, and briefly this heater comprises a metallic sheath 43 (Fig. 1) in which a suitable resistance element is secured, the resistance element being wound helically on a cylindrical supporting member 44, made from a suitable electrical insulating material such as porcelain. The space between the support and the sheath is filled with some suitable insulating material such as powdered magnesium oxide. It will be understood that the ends of the wound resistance wire are secured to suitable terminal members 45 (Fig. 2).

It will be understood that these heating elements provide a rather intensive heat source and, therefore, I prefer to provide the bottom wall of the container 10 with suitable ridges or inturned recesses 46 which as shown (Fig. 1) serves to space the bottom wall of the lower cooking utensil from the bottom wall of the pail 10. These ridges further serve to strengthen the bottom so that it will not buckle when heated, and also to preserve the bottom wall substantially flat.

Various meats, vegetables, cereals, etc. to be heated may be placed in the pans 11 and can be cooked at the same time with very little attention and with very good results. The heat from the elements 22 and 23 is distributed by means of the sheath 31 uniformly over a considerable wall area of the pail 10. As a result, heat is transferred directly from the bottom and side walls of the pail to the edibles within the pans 11.

It is to be noted that my invention provides a very compact and efficient arrangement of the parts which may be easily manufactured and assembled. The heating elements together with the terminals and leads may be easily removed as a unit for inspection, repair or replacement. Thus, in order to remove the entire heating unit it is merely necessary to unscrew the fastening members 35 and pull the terminal plate 25 together with the attached unit through the apertures 34 and 30 to the exterior of the cooker.

While I have shown a particular embodiment of my invention, it will be understood, of course that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. Electric cooking apparatus comprising a container for receiving the edibles to be cooked, an electric heating unit for applying heat directly to the bottom wall of said container and a metallic cup-shaped member having a high heat conductivity enclosing the lower portion of said container and said heating unit so as to be in good thermal relation with said heating unit and with a material area of the side walls of said container for conducting heat from said unit and for distributing it substantially uniformly to said side wall area, said cup-shaped member being provided with a lateral opening communicating with the space between the bottom walls of said container and said cup-shaped member through which opening said heating unit can be inserted and removed from the bottom of said container.

2. An electric cooker comprising a container, a cup-shaped sheath enclosing the lower portion of said container so that the bottom wall of said sheath is in spaced relation with the bottom wall of said container and the side walls of said sheath are in heat conducting relation with the walls of said container, said sheath being provided with a lateral opening affording communication with the space between said bottom walls and an electric heating element removably mounted within said space through said lateral opening and supported in good heat conducting relation with the bottom walls of said sheath and said container.

3. An electric cooker comprising a container for receiving the edibles to be cooked, a sheath formed of a metal having a high heat conductivity and having approximately the shape of the lower portion of said container fitted to said lower portion so as to encase a material portion of the side walls of said container in good thermal relation therewith, said sheath being provided with a shoulder to engage the bottom of said container to thereby limit the sheath wall depth in contact with said side walls of said container and to space the bottom wall of said sheath from the bottom wall of said container, and an electric heating element in the space between said bottom walls in good thermal relation with both of said walls.

4. An electrical cooker comprising a container, a cup-shaped sheath having a relatively high thermal conductivity mounted with its bottom wall in spaced relation with the bottom wall of said container and with its side walls in good thermal relation with the side walls of said container, said sheath being provided with a lateral opening providing communication with the space between said bottom walls, a plurality of sheathed heating units mounted in the space between said bottom walls so as to be in heat conducting relation with said walls and arranged to be inserted and removed from said space through said lateral opening and means for thermally insulating the walls of said cup-shaped sheath and the unsheathed portions of the walls of said container.

5. An electric cooker comprising a metallic pail, cooking pans within said pail, a cup-shaped sheath having a relatively high heat conductivity encasing the lower portion of said pail so that its side walls are in good heat conducting relation with the side walls of said container and its bottom wall is in spaced relation with the bottom wall of said container, said sheath being provided with a lateral opening providing communication with the space between said bottom walls, electrical heating elements removably fitted within said space through said opening and supported by said sheath in good heat conducting relation with said bottom walls, means for thermally insulating the outer walls of said sheath and the side walls of said container not encased by said sheath, and a heat insulated cover for said pail.

6. An electric cooker comprising a cooking pail, a sheath encasing the lower portion of said pail, the bottom wall of said sheath being spaced from the bottom wall of said pail, a plurality of heating elements mounted within the space between said bottom walls and supported by said sheath in thermal relation with the bottom wall of said pail, means securing said elements together so as to provide a unitary structure, said sheath being provided with a lateral opening through which said unitary structure can be inserted and removed from said space between said bottom walls and terminals for said heating elements arranged so that they may be electrically connected to provide a plurality of heating rates.

7. An electric cooker comprising a pail, an outer casing for said pail, a chamber beneath said pail, a plurality of electrical heating elements mounted within said chamber, said chamber and said casing being provided with aligned openings through which said heating elements can be inserted and removed from said chamber, said heating elements having portions projecting from the opening in said chamber, a block member, means securing said projecting portions to said block member so as to comprise said heating elements into a unitary heating structure insertable and removable bodily through the opening in said chamber and means detachably securing said block member to said outer casing.

8. A cooker comprising a pail, a metallic sheath having good heat conductivity encasing the lower portion of said pail with its side walls in good thermal relation with the side walls of said pail and with its bottom wall in spaced relation with the bottom wall of said pail, an electrical heating unit comprising a plurality of heating elements supported by said sheath within the space between said bottom wall and said sheath, said sheath being provided with an opening through which said heating unit can be bodily inserted and removed from said space and means for electrically connecting said heating elements so as to provide a plurality of heating rates.

CHARLES P. RANDOLPH.